Figure 1:
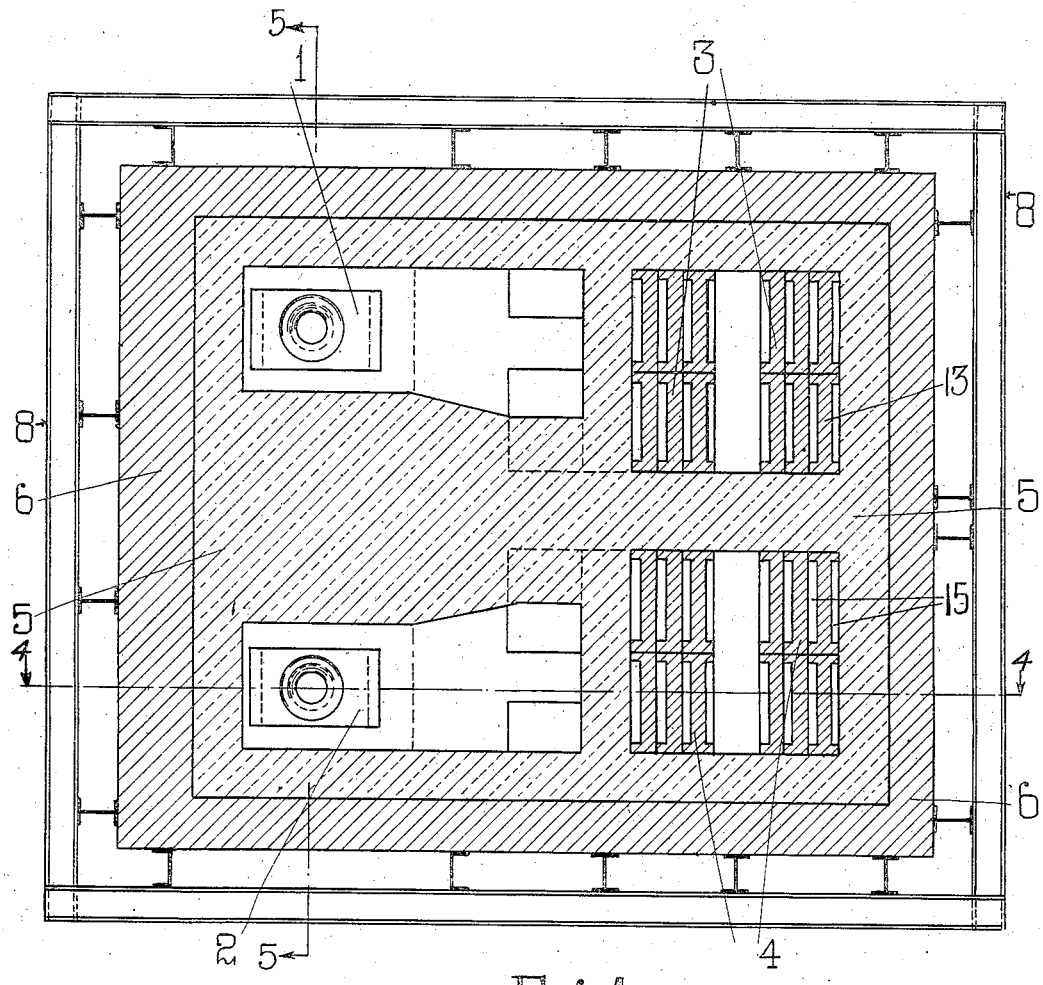

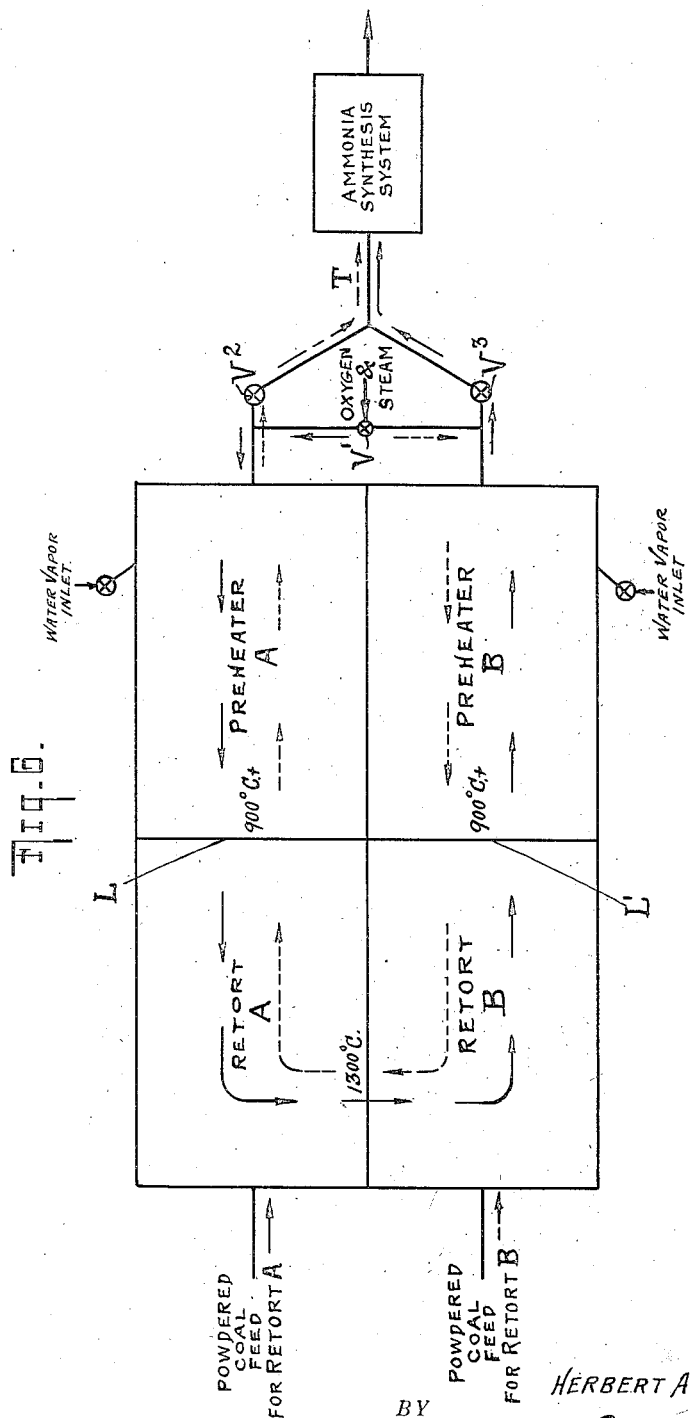

Patented Feb. 24, 1931

1,794,232

UNITED STATES PATENT OFFICE

HERBERT ALFRED HUMPHREY, OF STOCKTON-ON-TEES, ENGLAND, ASSIGNOR TO ATMOSPHERIC NITROGEN CORPORATION, OF SOLVAY, NEW YORK, A CORPORATION OF NEW YORK

PRODUCTION OF COMBUSTIBLE GASES

Application filed September 24, 1925, Serial No. 58,440, and in Great Britain September 24, 1924.

This invention relates to the production of combustible gases from pulverized or atomized fuel.

The main object of the invention is to provide a process and apparatus whereby combustible gases can be generated continuously and with high thermal efficiency, and whereby a high quality gas can be obtained but other objects will be apparent from the following description. The scope of the invention will be defined in the appended claims.

As far as I know practical success has never attended any of the various attempts that have been made to convert powdered fuel into producer or the like gas, probably because the conditions of working with powdered fuel are such that ordinary producer practice is but little guide to the proper conditions in the new art. In an ordinary gas producer the entering air and steam commence to react in the first parts of the fuel bed at a comparatively low temperature e. g. 600° C. and then the gaseous products of combustion, containing a large proportion of carbon dioxide, travel through hotter portions of the fuel bed to which heat has been supplied by the said combustion. Thus the combustion gases are subjected to a high temperature in the intimate presence of carbon, and their carbon dioxide is reduced to carbon monoxide. Then the resulting gases pass through the remaining colder portions of the fuel bed and leave the producer before any appreciable reversal of the reaction $$C + CO_2 \rightarrow 2CO$$

can occur. But if powdered fuel is to be employed this sequence of phenomena cannot be expected to occur. For if part of the fuel is burnt to carbon dioxide there will be no means for its subsequent reduction to carbon monoxide since the necessary intimate contact with highly heated carbon will be lacking. In the partial combustion of powdered fuel to produce a combustible gas there can be no corresponding zones of different temperatures, on account of the suspension of the particles of fuel in the blast gases. Moreover the fuel is present in comparatively small spatial concentration compared with the gases and therefore any effective reduction of carbon dioxide by carbon cannot be looked for.

According to my invention therefore I burn pulverized fuel with air and steam in such a way that the undesirable initial reactions which tend to occur if incomplete combustion is allowed to take place at a relatively low temperature, e. g. below 900° C. are eliminated. This elimination of undesirable initial reactions and the means therefor are the essential features of my invention.

My process consists in causing pulverized fuel to react with highly preheated steam and oxygen (as such or in the form of air or enriched air) at a very high temperature so that the conditions are favorable to the production of carbon monoxide and hydrogen and unfavorable to the existence of carbon dioxide and hydrocarbons, such high temperature being maintained essentially by returning to the combustion or gasifying chamber an abnormally large proportion of the available heat of the hot gaseous products in the form of preheat in the entering gases, and the entering gases thereby being preheated to a very high temperature, e. g. 1000° C. The gaseous reactants are thus carried through the temperature range within which undesirable reactions are possible before they encounter the fuel and consequently when the reaction does take place it is only valuable products that are obtained as resultants. The heat interchangers, where the entering gases are preheated at the expense of the hot gaseous products, become a primary and not a subsidiary feature of the design of the apparatus, and I have found that only by the use of efficient and extreme preheating (e. g. to 1000° C.) is it possible to maintain the combustion zone at a high temperature (e. g. 1300° C.) and also to obtain the elimination of the undesirable reactions hereinbefore referred to. Thus I employ heat exchangers which are of abnormal dimensions or efficiency as regards this particular art of producing gas from pulverized fuel although I am aware that heat exchangers of this kind are known and used in steel works practice for other purposes. It will be appreciated that such extreme preheating, demanding a relatively high (and in this art unprecedented) heat interchange efficiency, involves the use of apparatus of radically different design from that of those of previous use. Although, in a general way, preheating the gases entering a gas producer has already been proposed, an examination of such prior proposals shows that the amount of preheating actually accomplished can never have been sufficient to comply with the novel conditions I have laid down.

In carrying out my invention I have found that heat exchangers built on the regenerator principle are very suitable but other types such as recuperators may be employed.

Unless a cheap supply of oxygen is available (as for example where air is liquefied to produce nitrogen and the oxygen is a by-product) it becomes necessary to use an oxygen-containing gas such as air in the combustion or gasifying chamber, and consequently the gaseous resultants of the process will contain some nitrogen. It will, of course, be understood that the presence of nitrogen detracts from the value of the combustible gases finally obtained, but according to my invention the amount of nitrogen obtained in the final gases is reduced to the minimum possible. At the same time the other incombustible and therefore useless constituent that might occur in the gases, namely, carbon dioxide, is practically eliminated, and the net result of my process is that from unit weight of carbon consumed there is produced a maximum total content of carbon monoxide and hydrogen.

The preferred form of my process and apparatus will now be described with reference to the accompanying drawings.

Figure 2:
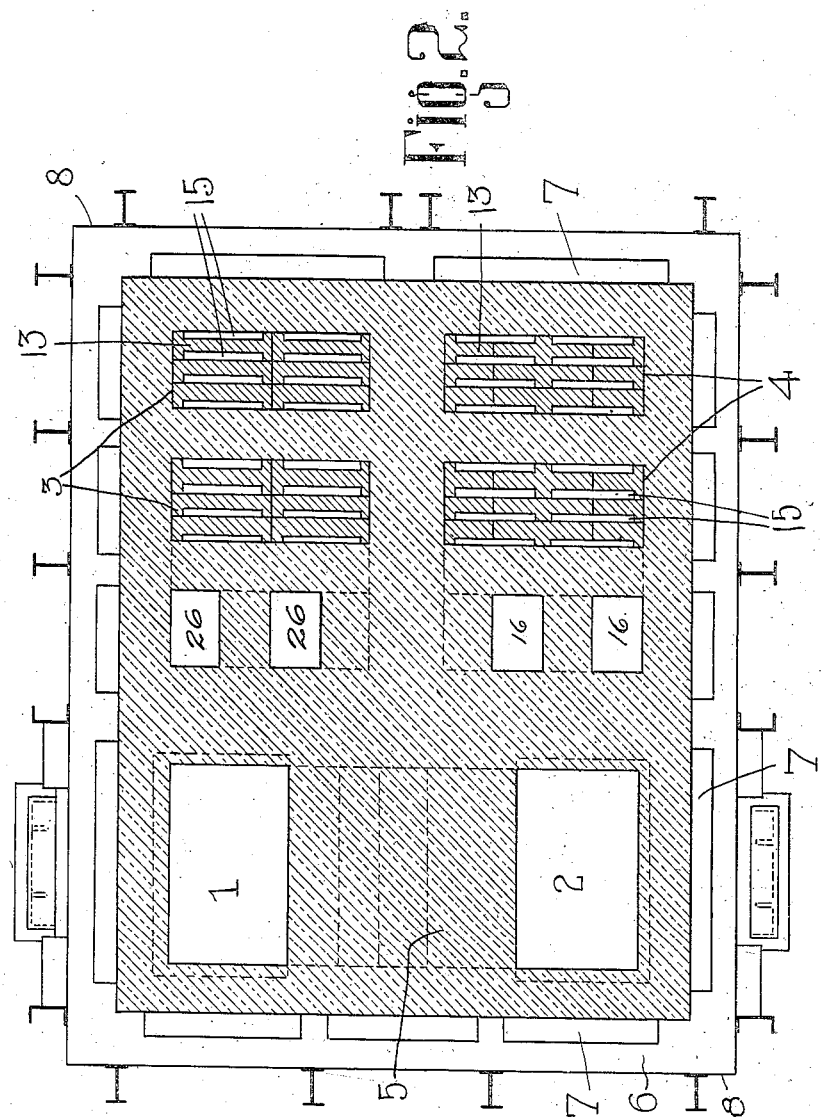
Figure 3:
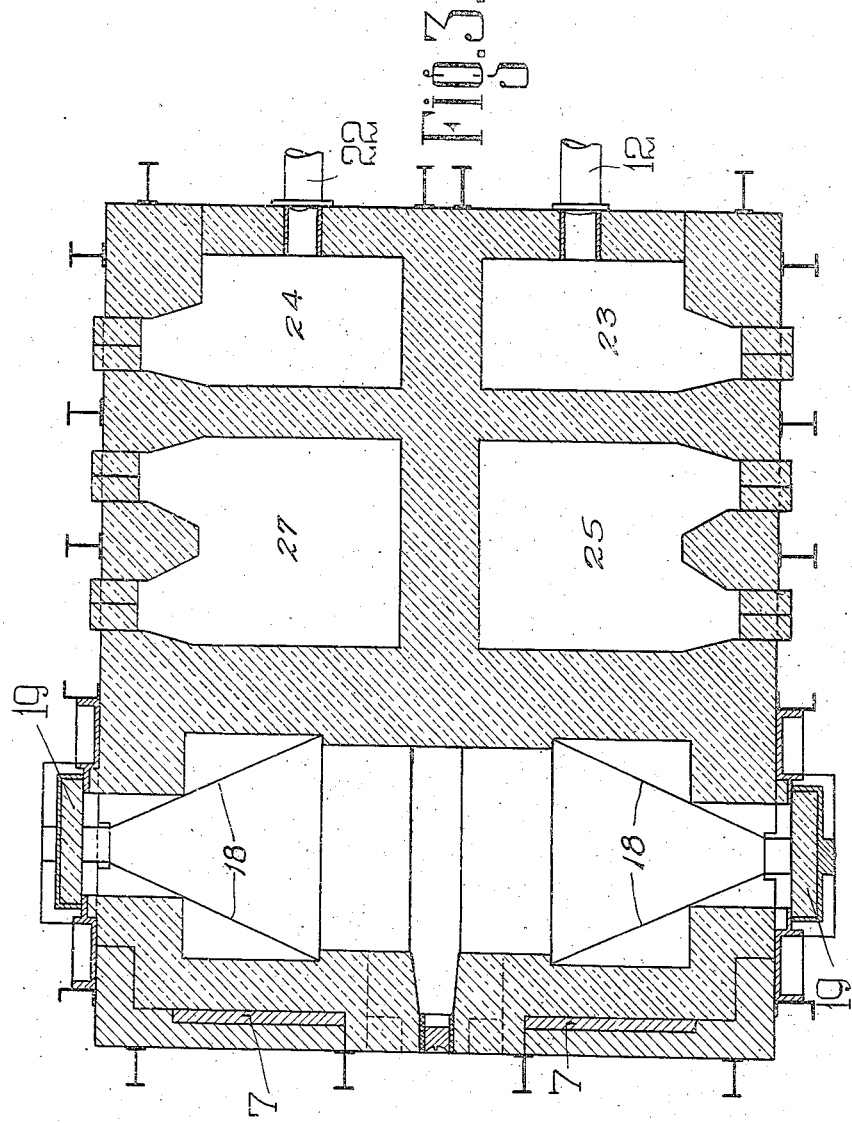
Figure 4:
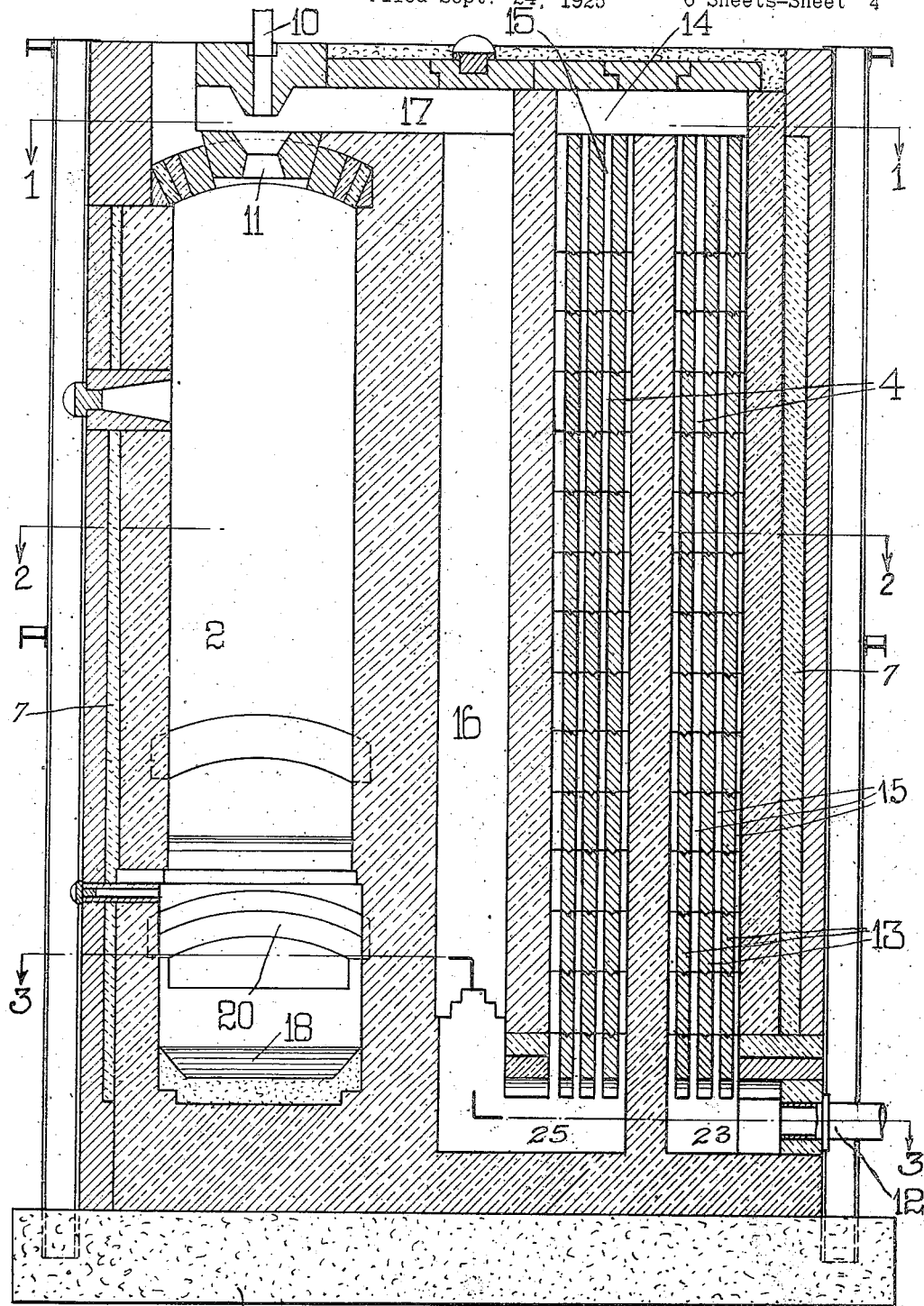
Figure 5:
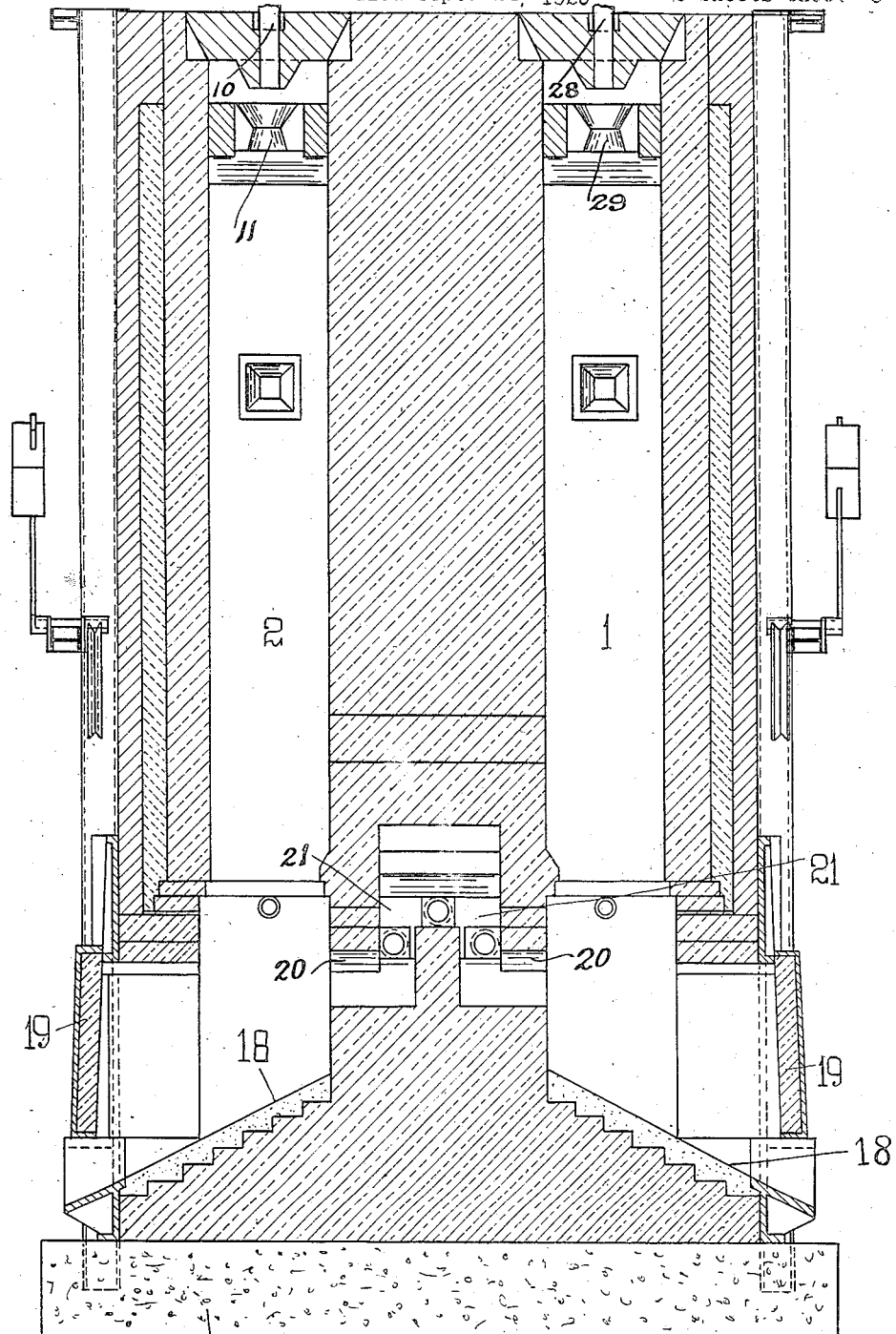

Fig. 1 is a transverse sectional view of an embodiment of my invention taken on line 1—1 of Fig. 4; Figs. 2 and 3 are views similar to Fig. 1 taken on lines 2—2 and 3—3 respectively of Fig. 4; Fig. 4 is a vertical section taken on line 4—4 of Fig. 1; Fig. 5 is a vertical section taken on line 5—5 of Fig. 1; and Fig. 6 is a diagrammatic view illustrative of the new process.

The apparatus may be regarded as a unit of a plant each unit comprising two combustion or gasifying chambers, each provided with a regenerator to act as a reservoir of heat. In general the material of construction will be firebrick, adapted to withstand the high temperatures obtaining within the apparatus. Other refractory materials may be used where advisable, or exposed firebrick surfaces may be coated with a layer of refractory material. It is important to reduce as far as possible the loss of heat from the system and accordingly the combustion or gasifying chambers and regenerators may be surrounded by heat insulating material. In Fig. 2 the combustion or gasifying chambers 1 and 2, and their respective regenerators 3 and 4 are shown completely surrounded by firebrick material 5. The outer wall 6 of the apparatus is conveniently made of red brick, but between it and the fire brick interior should be interposed layers of fullers earth as indicated at 7 in Figs. 2 and 4. The outer wall 6 should be supported by a steel frame as at 8 in Fig. 1, and the whole apparatus built on a concrete foundation (9 in Figs. 4 and 5).

Referring to Fig. 4, 2 is the combustion or gasifying chamber and 4 the regenerator. Powdered fuel such as ground or powdered coal, coke, and the like is fed in through the pipe 10 and through the nozzle 11. Let it be supposed that the regenerator has attained (in a manner to be described later) throughout its mass a very high temperature, for example above 1000° C., and is therefore ready to act as a preheater for the air and steam to be sent to the combustion or gasifying chamber. Appropriate quantities of a gas containing oxygen and steam, for example a mixture of air and steam are blown in at the port 12 to a chamber 23 below regenerator 4 and are caused to ascend the channels 15 beween the regenerator elements 13, the separate streams uniting in the space 14. The further path of the gases is continued through the down channels 15 of the regenerator, and by the time the gases leave the same they have been preheated to the required degree, say 1000° C. The hot gases pass through a space 25 and then ascend the space 16 and reach the horizontal channel 17 into which penetrates the powdered fuel injector 10. In the nozzle or burner 11 the preheated air and steam meet the descending fuel, and the latter burns in a sheet of flame. The temperature of the flame will depend upon the proportions of the reactants and upon the temperature to which the air and steam have been preheated, and to maintain desirably high reaction and preheating temperatures, the air and steam supplies are regulated in accordance with the rate of fuel feed. To insure complete gasification of the fuel during its fall through the combustion or gasifying chamber a slight excess of air or steam, preferably steam, should be provided. The ash from the fuel falls on to the sloping bed 18 and collects at the bottom thereof; if liquid it may conveniently be run off at intervals, but in any case the unconsumed residue collecting on 18 may be removed periodically through the cleaning doors 19 (see Fig. 5) with the aid of any suitable device. The resultant gases (consisting principally of hydrogen, carbon monoxide, and nitrogen) having left the combustion zone, travel down the chamber 2 and pass under the arch 20 into a baffle space 21 and thence upwards into the other combustion or gasifying chamber 1 which is idle when the chamber 2 is generating gas. The very hot resultant gases finally pass to the regenerator 3 (see Figs. 1 and 2), by way of spaces 26 and 27, give up their heat to the material of the regenerator, enter a chamber 24 below regenerator 3, and emerge from the apparatus by the port 22 (Figure 3) in a relatively cold condition. Any available heat the combustion gases still contain may be utilized, as for example in raising steam in a boiler. It will be observed that the gaseous products of the partial combustion follow in the apparatus a path which is the reverse of the corresponding path taken by the air and steam in their entry. When the process has been carried on for so long that one regenerator can only just supply to the air and steam the necessary preheat, the other regenerator will have become sufficiently hot to enable a change-over to be made. At this juncture then the appropriate change-over valve (not shown) is operated and air and steam are sent through the port 22 through the regenerator 3 to the combustion or gasifying chamber 1, powdered fuel being fed in through a pipe 28 and nozzle 29 corresponding to pipe 10 and nozzle 11 of Fig. 4 where the supply is at the same time stopped. With periodic change-over the production of combustible gases may be carried on continuously, and the gas produced when analyzed as it leaves the combustion chamber may be of such a quality as By volume.
Carbon monoxide _____ 38.4%
Hydrogen _____ 12.7%
Nitrogen _____ 48.9%

Such a gaseous mixture may find its use as power gas or it may be suitably treated by well known processes to yield a nitrogen-hydrogen mixture or even pure hydrogen. A nitrogen-hydrogen mixture suitable for ammonia synthesis is readily obtained by adding steam to the mixture of hydrogen, carbon monoxide, and nitrogen and subjecting the mixture to the action of an iron oxide or other suitable catalyst at a suitable temperature. By this known process all but a small part of the carbon monoxide may be replaced by an equal volume of hydrogen, according to the equation $H_2O + CO = CO_2 + H_2$ after removing from the gases carbon dioxide, the excess of steam, and the small amount of residual carbon monoxide the ratio of nitrogen to hydrogen in the gaseous mixture may be adjusted to 1:3 by adding suitable quantities of hydrogen from another source, and the mixture is then suitable for ammonia synthesis. It may be noted that if proper quantities of oxygen as well as of air be employed in my process it is quite possible to prepare directly such gaseous mixture as the following:

Per cent
Carbon monoxide _____ 55.4
Hydrogen _____ 19.6
Nitrogen _____ 25.0

After converting the carbon monoxide to an equal volume of hydrogen the resultant gaseous mixture will contain approximately three volumes of hydrogen to every one of nitrogen, and there will be no need to employ extra hydrogen from other sources to obtain the correct stoichiometric ratio for ammonia synthesis.

My invention is specially useful for the purpose of preparing nitrogen-hydrogen mixtures for ammonia synthesis since at the high temperatures at which the original gaseous mixture is produced it is impossible for any inert hydrocarbons, such as methane, to exist, and consequently the final nitrogen-hydrogen mixture obtained is sensibly free from such compounds. This fact is of considerable importance.

It has already been mentioned that I prefer to use an excess of steam in my process, so as to ensure complete gasification of the fuel with the minimum quantity of air. The excess steam present in the combustible gases serves as part of the steam required in the reaction $CO + H_2O = CO_2 + H_2$ and the steam to be added to the gases for the purpose of this conversion is accordingly somewhat less than would otherwise be necessary. This additional steam may be raised in a boiler to the heating of which may contribute any available heat still contained in the combustible gases leaving the regenerator. Alternatively the combustible gases may be circulated in contact with hot water and so caused to take up sufficient steam for the purpose of the reaction to follow. This method of adding the necessary amount of steam is not only an efficient method of utilizing the available heat of the exit gases, but also it secures the thorough washing of the gas and the freeing of it from dust before it comes in contact with the catalytic material.

If desired it may be arranged that this catalytic reaction shall take place partly or wholly within the generator itself. This may be done for instance by lining the regenerator walls with catalytic material, or by otherwise disposing the catalyst so as to be in contact with the gases produced from the powdered fuel, or independent catalyst chambers may be provided. The reaction between carbon monoxide and water vapor to produce hydrogen and carbon dioxide is exothermic, and therefore will supply heat to the apparatus. The optimum temperature for the reaction is in the neighbourhood of 500° C. and therefore the cooler parts of the regenerator will be more suitable for its occurrence. Arrangements may be made for introducing necessary extra steam at any part of the regenerator, or to independent catalyst chambers if these be used.

Practically any kind of pulverized or atomized fuel may be used in the carrying out of my invention. When powdered coal is used the proportions of air and steam necessary for its combustion will vary according to the percentage of volatile compounds contained in the coal.

The process as a whole is diagrammatically indicated in Fig. 6 of the drawings. In that figure the retorts marked A and B correspond to the retorts numbered 1 and 2 respectively in Figs. 1 and 5. The preheaters A and B shown in Fig. 6 correspond to the preheaters numbered 3 and 4 respectively in Fig. 1. The full-line arrows indicate the flow of gases on one setting of the valves $V^1$, $V^2$, and $V^3$, i. e. through preheater A, retort A, then through retort B and preheater B into an ammonia synthesis system. The dotted-line arrows indicate the gas flow when the three valves $V^1$, $V^2$, and $V^3$ are reversed. Irrespective of the direction of flow one requirement of the process is that in the region marked 1300° C. the temperature shall at all times be several hundred degrees above 900° C. say 1300° C. Another requirement of the process is that in the region of L and L' which represent the vestibules or regions immediately prior to the point where the gases first come into contact with carbonaceous material in the active retort, the temperature must not be allowed to fall below 900° C. Thus, when the gas flow is the one represented by the full lines, the temperature in the region of L in the upper part of Fig. 6 must be maintained at above approximately 900° C. and as soon as the temperature in the said region tends to fall below the stated value the valves are reversed. By this time the preheater B has been heated by the hot gaseous products from retort A to such an extent that when the gas flow assumes the dotted line course the temperature of the steam and oxygen at L' will be above approximately 900° C. As soon as the temperature at L' tends to fall below the required value the valves are again reversed. Near the right-hand end of the preheaters (in case the preheaters are here lined with catalytic material as heretofore described) valve-controlled water-vapor inlets for the catalytic reaction are located. The gaseous product which continuously passes through the line T is shown as leading to an ammonia synthesis system in which, as is well understood in the ammonia art, the gases may be accumulated in storage tanks, but in any event are either directly or from such storage tanks led through purifiers to bring them to a condition where except for inert rare gases, they contain practically only nitrogen and hydrogen in the 1:3 relation and in which the gases are subjected to great pressure, catalyzed, refrigerated, and otherwise dealt with in accordance with the prevailing or desired practice of the synthetic ammonia art.

I declare that what I claim is:—

1. The continuous process of producing combustible gas containing hydrogen and carbon monoxide substantially free from methane, hydrocarbons and carbon dioxide, which comprises establishing a flow of a mixture of steam and oxygen, preheating said mixture in a preheating stage to a temperature always upwards of approximately 1000° C., then passing said preheated mixture into and through one of two gasification chambers, feeding finely divided fuel into said chamber to contact and react with said preheated mixture and to generate gas at such intense temperatures as to contain hydrogen and carbon monoxide substantially free from methane, hydrocarbons and carbon dioxide, leading said hot generated gas from said first chamber to, into, and through a second chamber in an empty condition and then into and through a second preheating stage, withdrawing the resultant combustible gas from said second preheating stage, and effecting a reversal of flow of said mixture of steam and oxygen whenever the temperature thereof immediately prior to contact with said fuel tends to fall below approximately 1000° C., and maintaining in the chamber which functions as the gasifying chamber, as a result of any such reversals of flow, a temperature of approximately 1300° C.

2. The process set forth in claim 1, in which in each of the two connected gasifying chambers when functioning as the first or generating chamber upon each reversal of flow of the mixture of steam and oxygen, the finely divided fuel is fed into such chamber in a suspended condition and the several particles thereof are maintained in said suspended condition in a relatively large mass of enveloping gas throughout the entire reacting passage of said particles through said chamber.

3. The continuous process of producing combustible gas containing hydrogen and carbon monoxide substantially free from methane, hydrocarbons and carbon dioxide, which comprises establishing a flow of a mixture of steam and oxygen, preheating said mixture in a preheating stage to a temperature always upwards of approximately 1000° C., then passing said preheated mixture into and through a gasification chamber, feeding finely divided solid fuel into said chamber to contact and react with said preheated mixture and to generate gas at such intense temperatures as to contain hydrogen and carbon monoxide substantially free from methane, hydrocarbons and carbon dioxide, leading said hot generated gas into and through a second preheating stage, withdrawing the resultant combustible gas from said second preheating stage, effecting a reversal of flow of said mixture of steam and oxygen whenever the temperature thereof immediately prior to contact with said fuel tends to fall below approximately 1000° C. and, irrespective of the direction of gas flow effected by any such reversals, maintaining the several particles of the finely divided fuel in the gasification chamber in a suspended condition in a relatively large mass of enveloping gas throughout the entire reacting passage of said particles through said chamber.

In witness whereof, I have hereunto signed my name this 12th day of September 1925.

HERBERT ALFRED HUMPHREY.